(12) United States Patent
Andjelic et al.

(10) Patent No.: US 11,880,944 B2
(45) Date of Patent: Jan. 23, 2024

(54) METHOD AND APPARATUS FOR DISPLAYING INFORMATION

(71) Applicant: General Electric Technologies GmBH, Baden (CH)

(72) Inventors: Tigran Andjelic, Baden (CH); Oliver Sims, Baden (CH)

(73) Assignee: General Electric Technologies GmBH, Baden (CH)

( * ) Notice: Subject to any disclaimer, the term of this patent is extended or adjusted under 35 U.S.C. 154(b) by 0 days.

(21) Appl. No.: 16/883,448

(22) Filed: May 26, 2020

(65) Prior Publication Data

US 2020/0372719 A1 Nov. 26, 2020

(30) Foreign Application Priority Data

May 24, 2019 (EP) ...................................... 19176536

(51) Int. Cl.
*G06T 19/00* (2011.01)
*G06T 7/55* (2017.01)
*G02B 27/00* (2006.01)

(52) U.S. Cl.
CPC ........ *G06T 19/006* (2013.01); *G02B 27/0075* (2013.01); *G06T 7/55* (2017.01)

(58) Field of Classification Search
CPC .................................................. G06T 19/006
See application file for complete search history.

(56) References Cited

U.S. PATENT DOCUMENTS

| 10,147,399 B1 | 12/2018 | Mott et al. | |
| 2012/0075343 A1* | 3/2012 | Chen | G06T 19/006 345/633 |
| 2014/0168056 A1* | 6/2014 | Swaminathan | G06F 3/0481 345/156 |
| 2014/0168262 A1* | 6/2014 | Forutanpour | G06T 19/006 345/633 |

\* cited by examiner

*Primary Examiner* — Shivang I Patel
(74) *Attorney, Agent, or Firm* — General Electric Technologies GmBH (57) ABSTRACT

A method and apparatus for displaying information. The method comprises: determining a field of view of a user viewing an environment via a display of a display device; using the field of view, determining a focal region of interest of the user in the environment; providing a database comprising a list of objects and, for each object, a location of that object in the environment; using the list of objects and a location of the focal region in the environment, identifying one or more of the objects that are at least partially located in the environment in or proximate to the focal region; acquiring information related to the identified one or more objects; generating an image element comprising the acquired information; and displaying the generated image element on the display of the display device through which the user is viewing the environment.

14 Claims, 5 Drawing Sheets

METHOD AND APPARATUS FOR DISPLAYING INFORMATION

FIELD OF THE INVENTION

The present invention relates to the display of information on user devices.

BACKGROUND

Augmented reality is a technology that allows virtual imagery to be mixed with a real-world physical environment or space. Typically, near eye displays are worn by users to view the mixed imagery of virtual and real objects. In addition, a number of field devices such as smartphones and tablets can also be used to provide similar augmented reality view.

SUMMARY OF THE INVENTION

The present inventors have realised that, in certain situations, a user using an augmented reality device, e.g. a near-eye display device, may be presented with large amounts of information that may not be relevant to pre-defined pending tasks that the user is to perform.

In a first aspect, the present invention provides a method for displaying information. The method comprises: determining a field of view of a user viewing an environment via a display of a display device; using the field of view, determining a focal region of interest of the user in the environment; providing a database comprising a list of objects and, for each object, a location of that object in the environment; using the list of objects and a location of the focal region in the environment, identifying one or more of the objects that are at least partially located in the environment in or proximate to the focal region; acquiring information related to the identified one or more objects; generating an image element comprising the acquired information; and displaying the generated image element on the display of the display device through which the user is viewing the environment. Thus, information related to or relevant to objects in the environment being focused on by the user is displayed to the user.

The steps of determining the field of view and/or determining the focal region may be performed by the display device. The steps of providing the database, identifying the one or more of the objects, acquiring the information, and/or generating the image element may be performed by one or more computing devices remote from the display device. The method may further comprise sending the generated image element from the one or more computing devices to the display device.

The database may further comprise, for each object, additional information relating to that object (e.g. an identifier for that object, one or more physical properties of that object, a state of that object, a maintenance or repair schedule for that object, maintenance or repair instructions for that object, etc.). The information in the database may be compiled from multiple difference information sources or stream. The information in the database may be in one or more different formats, e.g. text data, image data, video data, audio data, etc. Acquiring the information may comprise retrieving the information related to the identified one or more objects from the database.

The method may further comprise determining a distance in the environment between the user or the display device and the identified one or more objects. The distance may be a physical distance between the user and an object in the real-world for example. The acquired information may be dependent on the determined distance. For example, if the determined distance is less than or equal to a threshold distance, a relatively large amount of information may be acquired and included in the image element. Thus, when the user is close to the one or more objects, relatively specific (i.e. more detailed) information may be displayed to the user. On the other hand, if the determined distance is more than the threshold distance, a relatively small amount of information may be acquired and included in the image element. Thus, when the user is relatively far from the one or more objects, relatively high-level, more abstract, non-specific (i.e. less detailed) information may be displayed to the user.

The method may further comprise: specifying a task to be performed by the user, the task specifying one or more objects in the environment. For example, a task list containing a plurality of task may be specified. The task list may specify an order in which the listed tasks are to be performed by the user. The step of identifying the one or more of the objects may comprise identifying one or more of the objects that are located in the environment in or proximate to the focal region and that are specified in the task (e.g. a current task from the task list, which is currently being performed or is about to be performed by the user). The acquired information for the one or more objects specified in the task may be dependent on the task. Thus, in some aspects, only information relevant to a task being performed (or about to be performed) by the user is displayed in the image element to the user. The display of non-relevant information (e.g. information relevant only to a previous or future task, or not relevant to any task, or related to extraneous objects) may be avoided.

The environment may be a real-world environment. The objects may be real-world, physical objects located in the real-world. The location of the objects may be geo-locations of the object.

The environment may be a virtual or digital environment. The objects may be virtual or digital objects.

The display device may be a device selected from the group of devices consisting of: a tablet computer, a smartphone, smartglasses, a see-through display device, a heads-up display, and a virtual reality headset. The device may be any augmented reality display device. The device may be any virtual reality display device.

In a further aspect, the present invention provides a system comprising one or more processors and a display device comprising a display, the display device operatively coupled to the one or more processors. The one or more processors are configured to: determine a field of view of a user viewing an environment via the display of the display device; using the field of view, determine a focal region of interest of the user in the environment; provide a database comprising a list of objects and, for each object, a location of that object in the environment; using the list of objects and a location of the focal region in the environment, identify one or more of the objects that are located in the environment in or proximate to the focal region; acquire information related to the identified one or more objects; generate an image element comprising the acquired information; and control the display to display the generated image element.

In a further aspect, the present invention provides a program or plurality of programs arranged such that when executed by a computer system or one or more processors it/they cause the computer system or the one or more processors to operate in accordance with the method of any of the preceding aspects.

In a further aspect, the present invention provides a machine-readable storage medium storing a program or at least one of the plurality of programs according to the preceding aspect.

DETAILED DESCRIPTION

Figure 1:
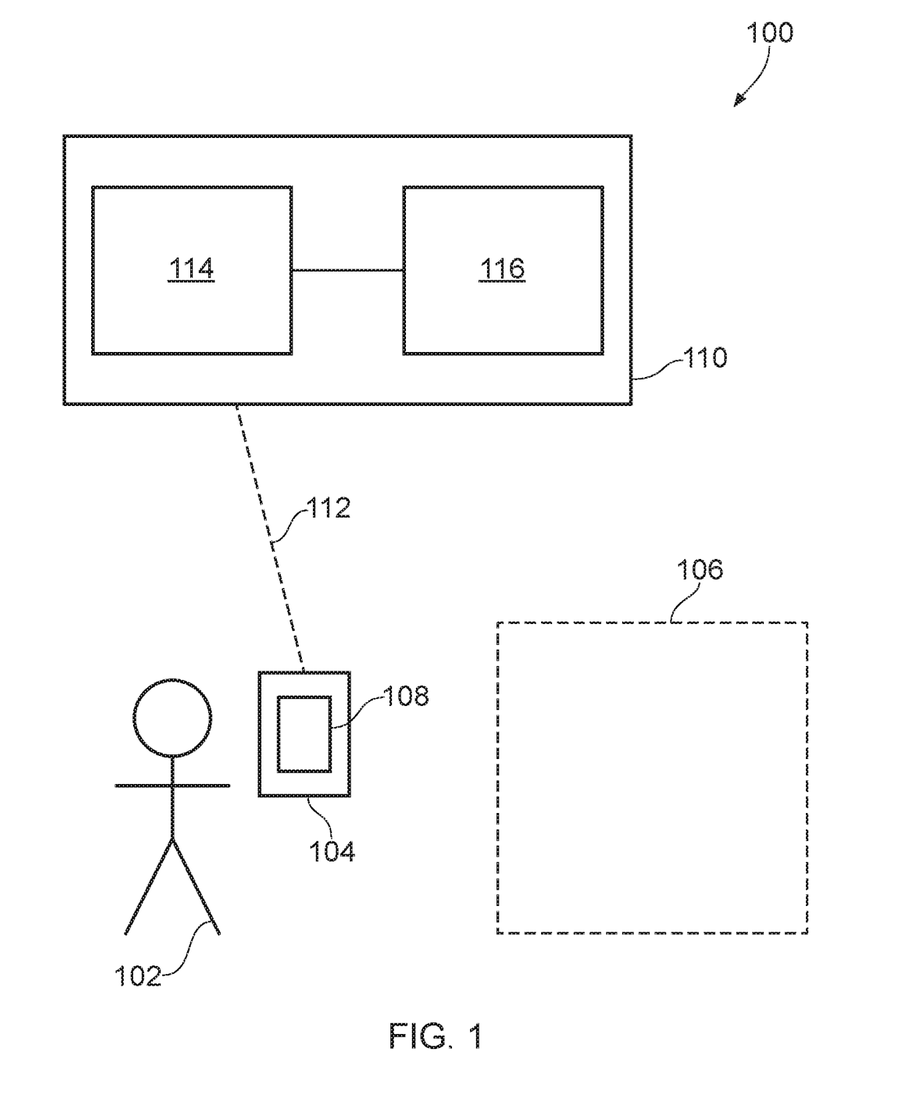
FIG. 1 is a schematic illustration (not to scale) of a system for displaying information to a user.

FIG. 1 is a schematic illustration (not to scale) of a system 100 for displaying information to a user 102.

In this embodiment, the system 100 comprises a user device 104 operated by the user 102 to view a or scene 106, i.e. portion of a real-world environment. The scene 106 is viewed via a display 108 of the user device 104.

The user device 104 may be any appropriate display device through which the user may view the scene 106 and on which information may be displayed. Examples of appropriate user devices which may be used include, but are not limited, Augmented Reality (AR) display devices, see-through display devices, smartglasses, smartphones, tablet computers, laptop computers, head-up displays (HUDs), and the like. The user device 104 is a mobile device that may be easily carried around, and moved by the user 102. For example, the user device 104 device may be a hand-held device, or is configured to be worn by the user 102. The user device 104 may be configured to measure its location in the environment, e.g. its geolocation.

In this embodiment, the system further comprises a so-called "back-end" system 110 configured to communicate wirelessly with the user device 104 via a wireless communication link 112. The back-end system 110 is configured to receive information from and send information to the user device 104 via the wireless communication link 112. The back-end system 110 may be physically located remote from the, portion of the real-world environment 106, the user 102, and the user device 104.

The back-end system 110 comprises a processor 114 and a database 116.

The processor 114 is configured to process information received from the user device 104, as described in more detail later below. The processor 114 is operatively coupled to the database 116 and is configured to retrieve information to the database 116. The processor 114 may be configured to upload information to the database 116.

The database 116 comprises information related to a plurality of real-world, physical objects. There may be information related to any number of real-world objects, for example more than 50 objects, more than 100 objects, more than 1000 objects, etc. In this embodiment, for illustration purposes, the objects for which information is contained in the database 116 are assets in an electric power network for delivering electricity from producers to consumers, i.e. an electrical grid. Examples, of such assets include, but are not limited to, utility poles, transformers, electric power distribution lines, surge arresters, power feeders (i.e. voltage power lines for transferring power from a distribution substation to distribution transformers), etc. In this embodiment, for each of those objects, the database 116 contains at least the following information: a name or identifier for that object, a geo-location of that object (i.e. a physical location of that object in the real-word environment 106), and a status of that object (this may include, for example, an indication that the object or asset is operating correctly, an indication that the objects is to undergo maintenance or repair, and/or a maintenance schedule for that object). The database 116 may contain the following information for one or more of the objects: real-time measurements of an object, historical measurements of an object, information relating to one or more physical parameters of an object (e.g. physical size, appearance, and/or temperature, etc.), electrical information relating to an object (e.g. power rating and/or electrical connections, etc.), a maintenance procedure/instructions, and/or a repair procedure/instructions, details on past maintenance/repair performed on an object, a schedule for maintenance of an object, etc.

The information stored in the database 116 may be in any appropriate form. For example, the database 116 may include text data, image data, video data, audio data, etc.

Apparatus, for implementing the above-described arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 2:
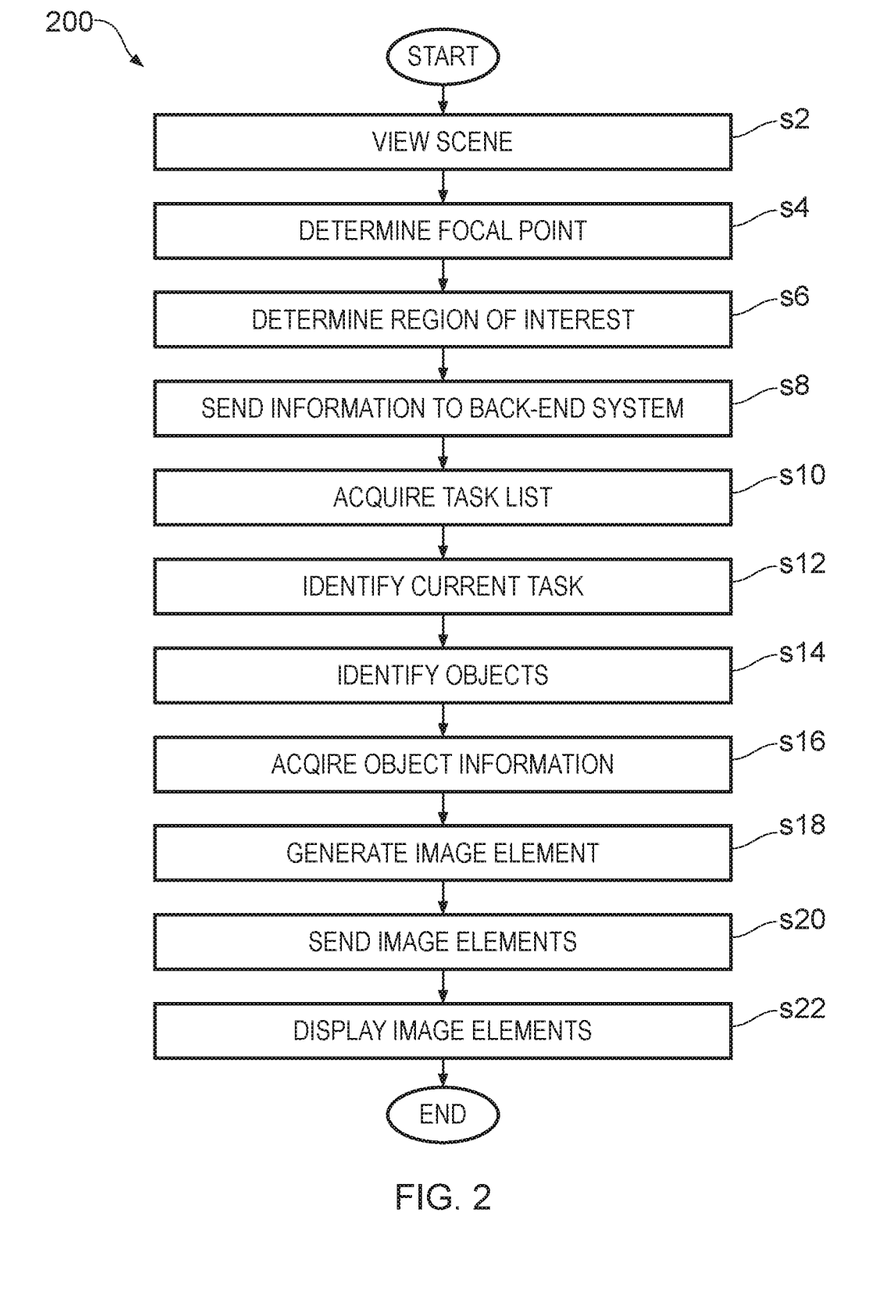
FIG. 2 is a process flow chart showing certain steps of a process of displaying information to a user.

FIG. 2 is a process flow chart showing certain steps of a process 200 of displaying information to a user 102, performable by elements of the system 100.

At step s2, the user 102 views the scene 106 via the display 108 of the display device 104.

At step s4, the display device determines a focal point of the user 102, i.e. a point in the scene 106 upon which the user is focussing his/her attention.

In some embodiments, e.g. embodiments in which the device 104 is a tablet computer or a smartphone, the focal point may be deemed to correspond to a fixed position on the display 108, for example a centre of the display 108.

In some embodiments, e.g. embodiments in which the device 104 is a pair of smartglasses, the focal point may be determined by tracking the user's eyes.

Figure 3:
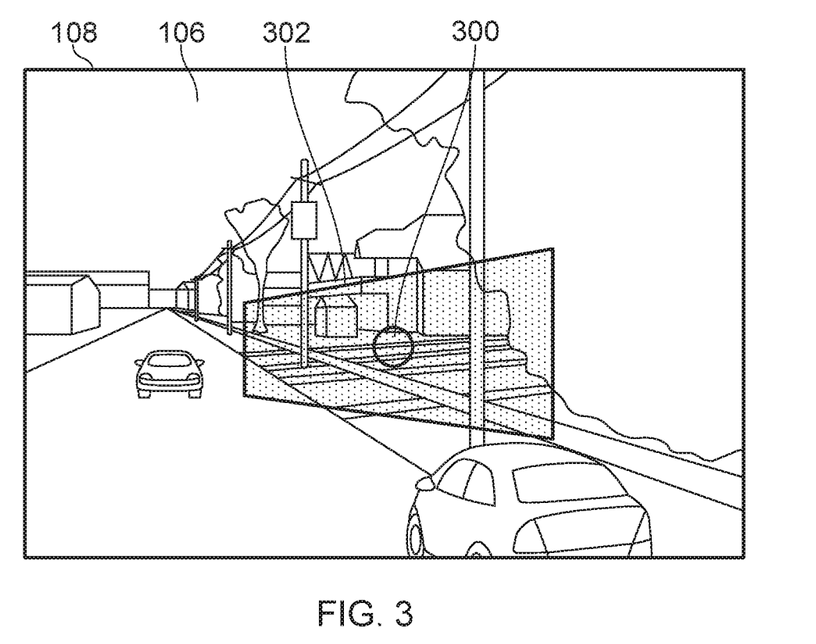
FIG. 3 is a schematic illustration (not to scale) showing a scene displayed on a user device, and a focal point of the user.

FIG. 3 is a schematic illustration (not to scale) showing the scene 106 displayed on the display 108. The determined focal point of the user 102 is indicated in FIG. 3 by a circle and the reference numeral 300.

In some embodiments, a region of the scene 106 corresponding to the user's depth of vision is also determined, for example based on the focal point 300. The user's depth of vision may be defined as a region that is a between a first distance in front of the focal point and a second distance behind the focal point. Objects within the depth of vision region may be considered to be substantially in-focus. Objects within the depth of vision region may be considered to be of interest to the user. The depth of vision of the user 102 is indicated in FIG. 3 by a box and the reference numeral 302.

The focal point 300 and/or the depth of vision 302 may be determined based on an orientation and/or compass reading of the user device 104 to determine direction the user 102. The focal point 300 and/or the depth of vision 302 may be determined based on a geolocation of the user 102 and/or the user device 104, e.g. as measured by the user device 104.

At step s6, the display device determines a zone of interest for user 102, i.e. a region, area, or zone in the scene 106 that is of interest to the user 102 or upon which the user is focussing his/her attention. The zone of interest may eb considered to be focal region of the user 102.

Figure 4:
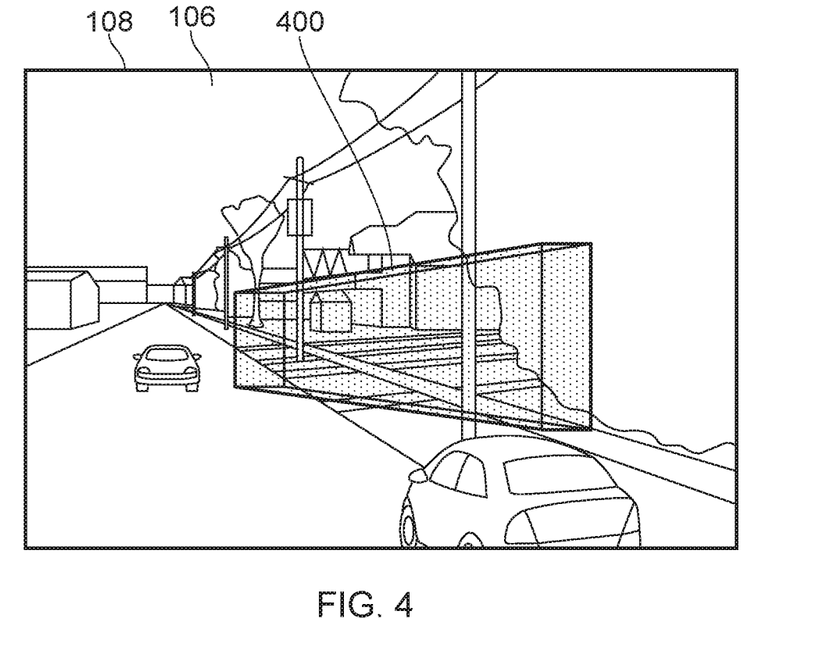
FIG. 4 is a schematic illustration (not to scale) showing a scene displayed on a user device, and a focal region of the user.

FIG. 4 is a schematic illustration (not to scale) showing the scene 106 displayed on the display 108. The determined zone of interest of the user 102 is indicated in FIG. 4 by a box and the reference numeral 400.

In this embodiment, the zone of interest 400 is a three-dimensional region. The zone of interest 400 may be determined in any appropriate way, for example using the focal point 300 and/or the depth of vision 302.

A location of the zone of interest 400 in the environment 106 is determined. This may be a geolocation of the zone of interest 400.

At step s8, the user device 104 sends information relating to the zone of interest 400 to the back-end system 110. In this embodiment, this information relating to the zone of interest 400 comprises the location of the zone of interest 400 in the environment 106.

At step s10, the back-end system 110 acquires a task list for the user 102.

In this embodiment, the task list for the user 102 comprises one or more tasks that are to be performed or completed by the user 102. The task list may specify an order in which the user 102 is to perform those tasks. In this embodiment, the tasks relate to one or more of the objects for which information is stored in the database 116. Each task in the task list is specifies one or more of the objects and an action that is to be performed on those one or more objects. By way of example, example tasks may be:

Task A: Object: Feeder X: Action: Deactivate feeder;
Task B: Objects: Transformer Y; Transformer Z: Action: Perform maintenance on transformers.

At step s12, the processor 114 identifies a current task for user 102 to perform using the task list.

At step s14, using the received information relating to the zone of interest 400 and the specification of the current task, the processor 114 identifies one or more of the objects in the database 116 that are both relevant to the current task, and that are physically located in the environment at least partially in or proximate to the zone of interest 400.

For example, the processor 114 may first filter the database 116 such that only those objects specified in the current task are considered, and compare the locations of those objects stored in the database 116 with the received location of the zone of interest 400 to further filter the objects so that, from the task-related objects, only those objects located in or proximate to the zone of interest 400 are considered, or vice versa.

In some embodiments, objects that are physically located directly above the zone of interest 400 may be identified. Thus, even though the user's attention may be directed to a zone of interest 400 at ground level, objects located above ground level (e.g. power grid assets mounted on utility poles) may be identified. In some embodiments, objects that are physically located directly below the zone of interest 400 may be identified. Thus, even though the user's attention may be directed to a zone of interest 400 at ground level, buried objects (e.g. underground power lines etc.) may be identified.

Figure 5:
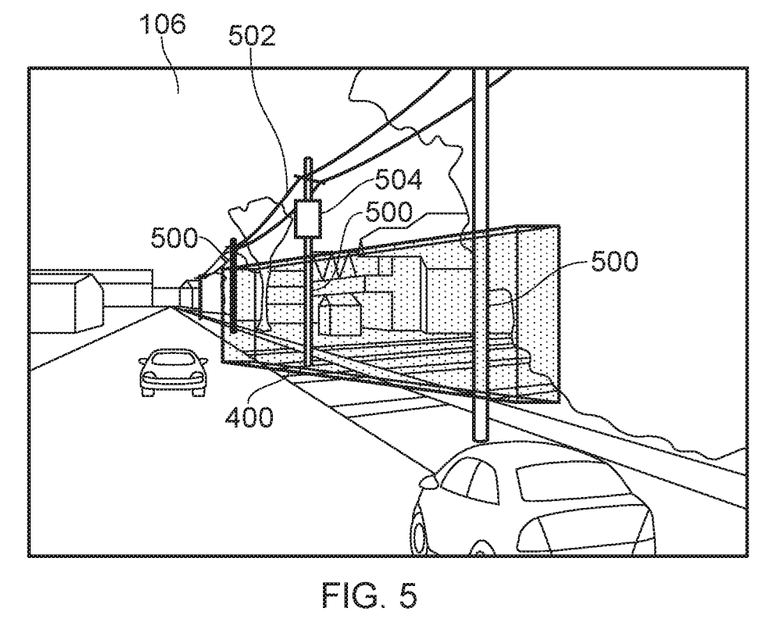
FIG. 5 is a schematic illustration (not to scale) showing the scene and a plurality of objects identified therein.

FIG. 5 is a schematic illustration (not to scale) showing the scene 106. FIG. 5 further indicates a plurality of objects that may be identified to be both relevant to a current task, and that are physically located in or proximate to the zone of interest 400. Specifically, FIG. 5 shows a plurality of utility poles 500, a power feeder 502 (e.g. Feeder X), and a transformer 504 (e.g. Transformer Y).

At step s16, the processor 114 acquires information related to the each of the identified objects. This information may be retrieved from the database 116. Examples of such information may include, but is not limited to, one or more of: a status of an object, a physical parameter of an object, electrical information relating to an object, a maintenance procedure/instructions, and/or a repair procedure/instructions, etc.

In some embodiments, the information acquired for an object is based on the current task. For example, the processor 114 process or filter the database 116 such that only information relating to the current task is acquired. Any processing or filtering of the database may be performed, for example filtering based on keywords, machine learning based techniques, etc.

By way of example, if the current task is Task A (specified above), the acquired information may include one or more physical properties of Feeder X, one or more electrical properties of Feeder X, and instructions for deactivating Feeder X. As another example, if the current task is Task B (specified above), the acquired information may include one or more physical and/or electrical properties of Transformer Y and Transformer Z (e.g. real time measurements for the H2 gasses in the oil of the transformers, power ratings of the transformers, real-time measurements of the oil temperature in the transformers, etc.), and instructions or procedures for performing maintenance operations on the transformers Y and Z.

At step s18, the processor 114 generates one or more image elements using the acquired information. Generation and display of the image elements will be described in more detail later below with reference to FIGS. 6 and 7.

At step s20, the back-end system 110 sends the generated one or more image elements to the user device 104.

At step s22, the user device 104 displays, on the display 108, the received image elements.

Figure 6:
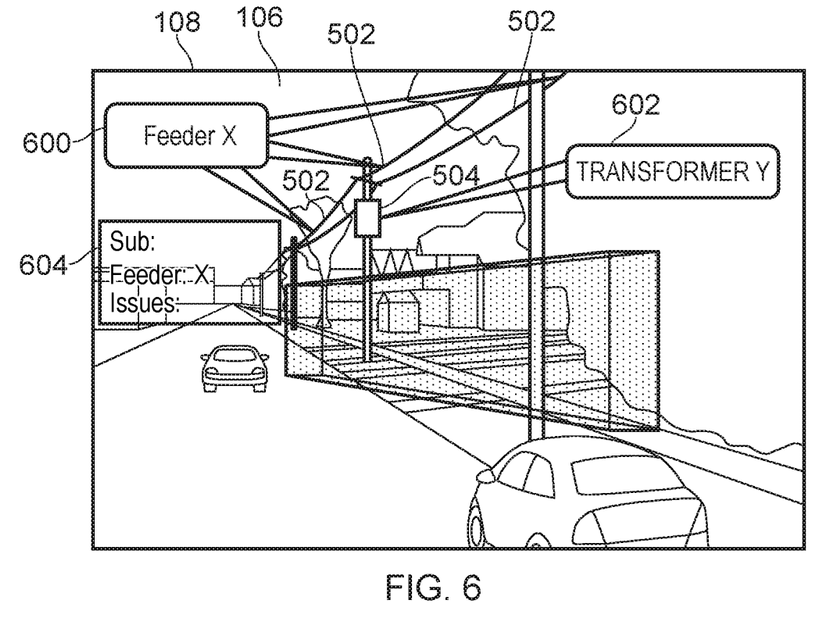
FIG. 6 is a schematic illustration (not to scale) showing the scene and a plurality of image elements displayed on the display.

FIG. 6 is a schematic illustration (not to scale) showing the scene 106 displayed on the display 108. FIG. 6 further shows a plurality of image elements 600, 602, 604 displayed on the display 108. The image elements 600-604 may be superimposed or overlaid onto the scene 106.

In this embodiment, a first image element 600 indicates multiple objects or multiple parts of an object in the scene 106. Specifically, as shown in FIG. 6, the first image element 600 indicates multiple sections of power line as being part of or belonging to Feeder X 502. The first image element 600 is attached to the multiple sections of Feeder X 502 such that, if the user device 104 is moved by the user 102, the first image element 600 remains attached to and indicating those sections of Feeder X 502. The first image element 600 visually enhances a collection (i.e. a plurality) of objects.

In this embodiment, a second image element 602 indicates a single object in the scene 106. Specifically, as shown in FIG. 6, the second image element 602 indicates Transformer Y 504. The second image element 602 is attached to Transformer Y in the image such that, if the user device 104 is moved by the user 102, the second image element 602 remains attached to and indicating Transformer Y 504. The second image element 602 visually enhances a single object.

In this embodiment, a third image element 604 is not attached to an object in the displayed image. In this embodiment, the third image element 604 occupies a predefined region of the display 108. In some embodiments, the third image element 604 remains at that predefined region of the display 108 even if the user device 104 is moved by the user 102. In this embodiment, the third image element 604 contains contextual information which may be useful to the user 102 when performing his/her assigned tasks. Specifically, as shown in FIG. 6, in this embodiment, the third image element 604 indicates a current location of the user 102, a relevant object, and a number of issues (e.g. tasks or sub-tasks) to be dealt with by the user 102. The third image element 604 visually enhances the scene 106.

In some embodiments, the information displayed or contained in an image element may be dependent on a physical distance (i.e. a distance in the environment) between the user 102 (or the user device 104) and one of more of the objects. For example, in some embodiments, when the user 102 is relatively from an object, the information displayed to the user 102 about that object in an image element may be general or high level, or may be restricted in some way to reduce that amount of information displayed. For example, referring to FIG. 6, in this instance, the user 102 is located relative far from Transformer Y and as such only relatively high-level, general information is displayed to the user 102 in the second image element 602 (specifically, the identifier "Transformer Y" and a pointer to that object 504 in the image).

The user 102/device 104 may be deemed to be far from an object in the real-world by the display device 104, or more preferably by the processor 114. The user 102 may be deemed to be far from an object in the real-world as follows. First, geolocations of the user 102/device 104 and the object in question are determined. Secondly, using the determined locations, a distance between the user 102/device 104 and the object in question is determined. Thirdly, the determined distance is compared to a threshold distance. If the determined distance is greater than the threshold distance, the user 102 is deemed to be far from the object and thus only high-level or a restricted amount of the information relating to the object is displayed to the user 102.

In some embodiments, when the user 102 is relatively close to an object, the information displayed to the user 102 about that object in an image element may be more specific and/or a greater amount of information may be displayed to the user 102 (compared to if the user 102 was far from the object).

Figure 7:
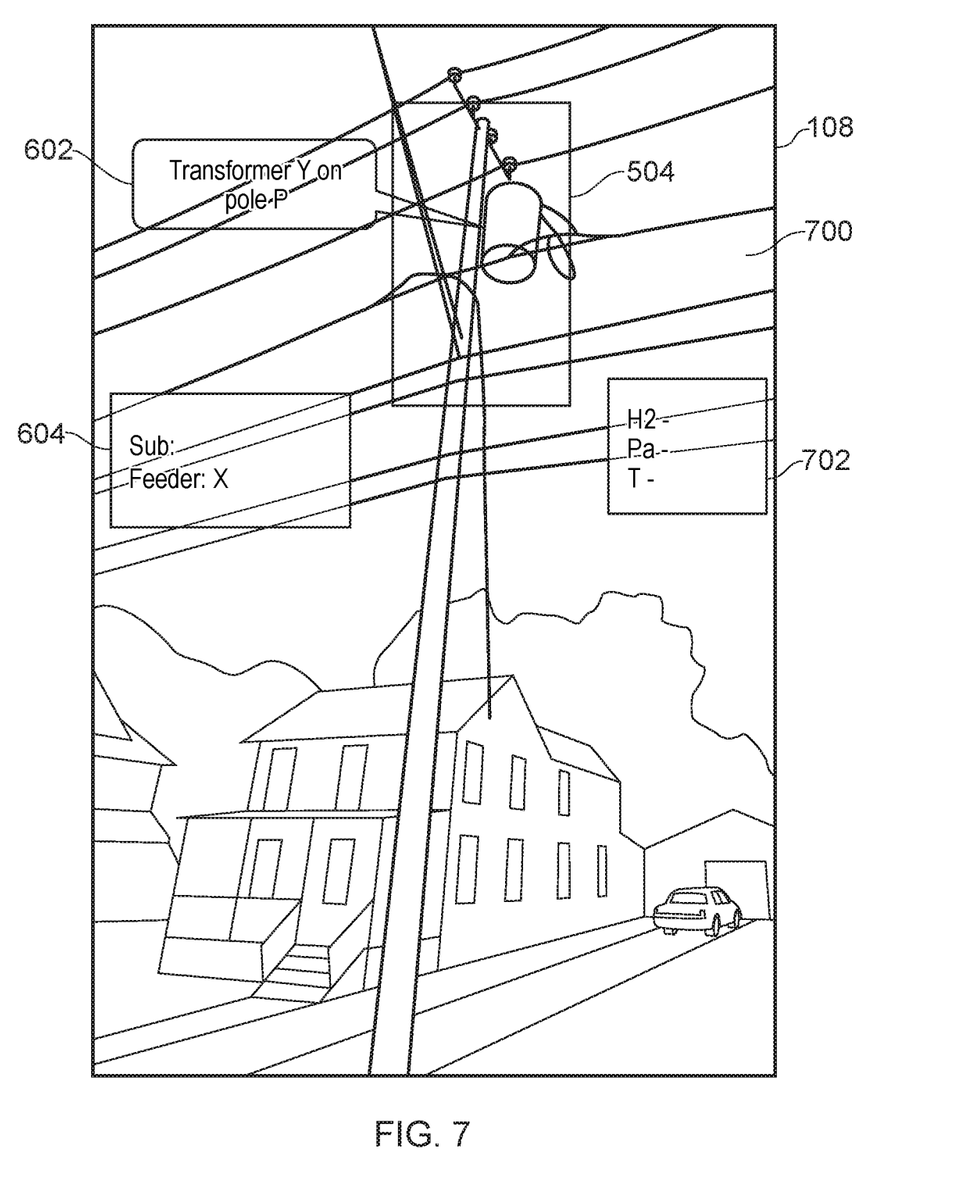
FIG. 7 is a schematic illustration (not to scale) showing a further scene and a plurality of image elements displayed on the display.

FIG. 7 is a schematic illustration (not to scale) showing a further scene 700 displayed on the display 108. The further scene 700 is a scene viewed via the display device 104 when the user 102 is close to Transformer Y 504. FIG. 7 further shows the second image element 602, the third image element 604, and a fourth image element 702 displayed on the display 108. The image elements 602, 702, 704 may be superimposed or overlaid onto the scene 106.

In this embodiment, as the user 102 is close to Transformer Y 504, the second image element 602 displays more detailed information (or more information) relating to Transformer Y 504 than if the user 102 was far from Transformer Y 504. Specifically, the second image element 602 now also indicates that Transformer Y 504 is located on utility pole P.

In this embodiment, the fourth image element 702 is not attached to an object in the displayed image. In this embodiment, the fourth image element 702 occupies a predefined region of the display 108. In this embodiment, the fourth image element 702 contains further information relating to Transformer Y 504 which may be useful to the user 102 when performing his/her assigned tasks. Specifically, as shown in FIG. 7, in this embodiment, the fourth image element 702 includes real time measurements for the H2 gasses in the oil of Transformer Y 504 and a real-time measurements of the oil temperature in Transformer Y 504 the transformers. In some embodiments, other information, such as instructions or procedures for performing maintenance operations on Transformer Y may be included (e.g. as a hyperlink or URL to a procedure document that may be selected by the user). In some embodiments, some or all of the information in the fourth image element 702 may be included in a different image element, e.g. the second image element 602.

The user 102/device 104 may be deemed to be close to an object in the real-world by the display device 104, or more preferably by the processor 114. The user 102 may be deemed to be close to an object in the real-world as follows. First, geolocations of the user 102/device 104 and the object in question are determined. Secondly, using the determined locations, a distance between the user 102/device 104 and the object in question is determined. Thirdly, the determined distance is compared to a threshold distance. If the determined distance is less than or equal to the threshold distance, the user 102 is deemed to be close to the object and thus relatively detailed or a greater amount of the information relating to the object is displayed to the user 102.

Thus, the process 200 of displaying information to the user 102 is provided.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

The above-described method tends to enhance a user's awareness of pre-recorded real-world objects (i.e. the objects for which information is stored in the database) when those objects are observed through, e.g., smartglasses or a smartphone or tablet device. The relevant object or objects, for user's awareness and within a narrowed field of vision, are identified. An enhanced image is generated taking into account user's pre-assigned set of tasks and relevant objects spatial proximity to the user. The enhanced image is displayed to the user, via a see-through display, phone or tablet display devices. The enhanced image visually decorates the appearance of pre-recorded real-world objects that are relevant to user's pre-assigned tasks based on their spatial proximity to the user's chosen focal point within the scene. The appearance of other pre-recorded objects that are not relevant to users' tasks or that are spatially out of range may be diminished. The enhanced image may focus on one dominant pre-recorded real-world object. The optimized image can visually enhance the appearance of a single object or a collection of objects (i.e. a plurality of objects) so that it facilitates user's awareness of immediate scheduled tasks.

Presented information may be prioritized based on the user's scheduled tasks. The tasks may require the user to interact with one or more physical objects or assets along a pre-recorded asset network. An optimized image is generated that visually enhances the appearance of such pre-recorded physical objects that the user may be expected to interact with while and/or diminishes the appearance of objects that the user is not expected to interact with.

In some implementations, the user's intent for the next scheduled task is determined by analysing the user's eye movements, and intensity of the user's gaze with respect to the pre-recorded physical objects in the user's environment. In some implementations, the user's intent for the next scheduled task is automatically determined based on the user's geolocation and proximity to relevant pre-recorded objects that are relevant to the next scheduled tasks.

Advantageously, object identification and image element generation are performed by the back-end system. Thus, the computational burden on the user device tends to be reduced.

Advantageously, computationally burdensome image processing (e.g. to identify objects in an image) tends to be avoided by the above-described method. This tends to be provided at least in part by the database comprising information related to predefined potential objects of interest.

The above described systems and methods tend to enable field users (or office users that require street view validation) to receive additional guidance and general asset awareness, relevant to their scheduled tasks, when finding and approaching field asset pre-recorded locations. In congested urban areas, it is often difficult to ascertain which of the assets are relevant to the scheduled task or to gather collective asset information that may be impacted by user field actions. For example, if the user is expected to isolate part of the electric or gas or water network, they need to know the layout of that section before and after isolation point as well as the number of impacted utility customers or the head end asset impact from the loss of load. Currently the field users have to communicate repeatedly with the control room staff, and take a number of specific measurements for a number of assets in immediate vicinity in order to build such picture for themselves. These task preparation activities tend to be time consuming and costly. The above-described systems and methods tend to alleviate this, tends to significantly reduce task preparation, and tends to enable the field user to focus more intently on the current task.

Many conventional systems and procedures may overwhelm the field users with all available information about individual assets. This also may require the field users to know or ascertain what information is relevant to the task in hand. The above-described systems and methods tend to filter out information that is not relevant to the user, and focuses only on most relevant aspects.

The above-described systems and methods tend to significantly reduce field user task preparation time. For example, for inspection tasks, the user may be told by the user device which assets to inspect by visual guidance in the displayed image. For servicing tasks, the user may be told by the user device the service steps as well as previous service schedule history so that they can determine faster what needs doing this time.

The above-described systems and methods may display location indicators to the user indicating the physical location of relevant assets, and guiding the user to those assets.

The system technically connects various pre-recorded asset information feeds and utilises their recorded location to provide advanced label filtering and label aggregation. The above-described systems and methods tends to utilise its defined heuristics and derive what is relevant amongst multitude of available asset information.

In the above embodiments, the environment is a real-world environment, the objects are physical objects in the real world, and the object locations are real-world locations, e.g. geo-locations. Also, in the above embodiments, the image elements are superimposed or overlaid on an image of the real-world. Thus, the system and methods are implemented to provide an augmented reality experience to the user. However, in other embodiments, the system and methods are implemented as a virtual reality system. For example, the environment may be a virtual or digital environment, the objects may be virtual or digital objects, and the object locations may be locations in the virtual or digital environment. The user device may be, for example, a virtual realty device comprising a virtual reality headset.

What is claimed:

1. A method for displaying information, the method comprising:
   determining a field of view of a user viewing an environment via a display of a display device;
   determining a focal region of interest of the user in the field of view;
   providing a database comprising a list of objects and, for each object, a location of that object in the environment;
   specifying a task to be performed by the user, the task specifying one or more objects in the environment;
   using the list of objects and a location of the focal region of interest in the environment, identifying at least one of the objects specified by the task that are at least partially located in the environment in or proximate to the focal region of interest;
   acquiring information related to the identified one or more objects, wherein the acquired information for the one or more objects specified in the task is dependent on the task;
   generating an image element comprising the acquired information; and
   displaying the generated image element on the display of the display device through which the user is viewing the environment.

2. The method of claim 1, wherein determining the field of view and determining the focal region is performed by the display device.

3. The method of claim 1, wherein providing the database, identifying the one or more of the objects, acquiring the information, and generating the image element is performed by one or more computing devices remote from the display device.

4. The method of claim 3, further comprising sending the generated image element from the one or more computing devices to the display device.

5. The method of claim 1, wherein:
   the database further comprises, for each object, additional information relating to that object; and
   acquiring the information comprises retrieving the information related to the identified one or more objects from the database.

6. The method of claim 1, further comprising:
determining a distance in the environment between the user or the display device and the identified one or more objects; wherein
the acquired information is dependent on the determined distance.

7. The method of claim 6, wherein:
if the determined distance is less than or equal to a threshold distance, a relatively large amount of information is included in the image element; and
if the determined distance is more than the threshold distance, a relatively small amount of information included in the image element.

8. The method of claim 1, wherein
identifying the one or more of the objects comprises identifying one or more of the objects that are located in the environment in or proximate to the focal region and that are specified in the task.

9. The method of claim 1, wherein the environment is a real-world environment and the objects are physical objects located in the environment.

10. The method of claim 1, wherein the environment is a virtual or digital environment and the objects are virtual or digital objects.

11. The method of claim 1, wherein the display device is a device selected from the group of devices consisting of: a tablet computer, a smartphone, smartglasses, a see-through display device, a heads-up display, and a virtual reality headset.

12. A system comprising:
one or more processors; and
a display device comprising a display, the display device operatively coupled to the one or more processors; wherein the one or more processors are configured to:
determine a field of view of a user viewing an environment via the display of the display device;
determine a focal region of interest of the user in the field of view;
provide a database comprising a list of objects and, for each object, a location of that object in the environment;
specify a task to be performed by the user, the task specifying one or more objects in the environment;
using the list of objects and a location of the focal region of interest in the environment, identify at least one of the objects specified by the task that are located in the environment in or proximate to the focal region of interest;
acquire information related to the identified one or more objects, wherein the acquired information for the one or more objects specified in the task is dependent on the task;
generate an image element comprising the acquired information; and
control the display to display the generated image element.

13. A program or plurality of programs arranged such that when executed by a computer system or one or more processors it/they cause the computer system or the one or more processors to operate in accordance with the method of claim 1.

14. A machine-readable storage medium storing a program or at least one of the plurality of programs according to claim 13.

* * * * *